United States Patent [19]

Libucha et al.

[11] Patent Number: 5,680,303
[45] Date of Patent: Oct. 21, 1997

[54] COMMUNICATION DEVICE SHARING ON A LOCAL AREA NETWORK

[75] Inventors: Mark A. Libucha, Hilliard; David J. Crone, Columbus, both of Ohio

[73] Assignee: CompuServe Incorporated, Columbus, Ohio

[21] Appl. No.: 476,710

[22] Filed: Jun. 7, 1995

[51] Int. Cl.$^6$ .......................... G05B 15/02; G05B 19/18
[52] U.S. Cl. ............................................. 364/138; 395/500
[58] Field of Search .................................. 364/134, 138; 395/500

[56] References Cited

U.S. PATENT DOCUMENTS 5,363,487  11/1994  Willman et al. ...................... 395/275
5,423,022   6/1995  Ackley ................................. 395/500
5,491,694   2/1996  Oliver et al. ....................... 370/85.4
5,499,378   3/1996  McNeill, Jr. et al. ............... 395/500
5,581,558  12/1996  Horney, II et al. .................. 370/401

*Primary Examiner*—Paul P. Gordon
*Assistant Examiner*—Robert J. Dolan
*Attorney, Agent, or Firm*—Standley & Gilcrest

[57] ABSTRACT

The X.25 device driver allows an X.25 card to be shared by workstations on a local area network. The approach used for the X.25 device driver may be used for sharing other devices on a local area network as well. The device driver for the device to be shared is implemented as a file system so that the device's location is hidden from application programs. Because the device driver is a file system driver, applications may use standard system calls, rather than device specific calls, to access the device.

5 Claims, 3 Drawing Sheets

| FUNCTION | MEANING |
|---|---|
| CLOSE HANDLE() | (RETURN A HANDLE FOR AN X.25 CONNECTION TO THE OPERATING SYSTEM) |
| CREATE FILE() | (GET A HANDLE FOR AN X.25 CONNECTION) |
| DEVICE IO CONTROL() | (CONFIGURE X.25 LINE FOR COMMUNICATIONS) |
| FLUSH FILE BUFFERS() | (FORCE ALL PREVIOUS WRITES TO BE DELIVERED TO THE REMOTE END) |
| READ FILE() | (READ DATA FROM AN X.25 LINE, SYNCHRONOUSLY OR ASYNCHRONOUSLY) |
| READ FILE EX() | (READ DATA FROM AN X.25 LINE ASYNCHRONOUSLY) |
| WRITE FILE() | WRITE DATA TO AN X.25 LINE, SYNCHRONOUSLY OR ASYNCRONOUSLY.) |
| WRITE FILE EX() | (WRITE DATA FROM AN X.25 LINE ASYNCHRONOUSLY) |

Fig. 2

COMMUNICATION DEVICE SHARING ON A LOCAL AREA NETWORK

BACKGROUND AND SUMMARY OF THE INVENTION

The present invention relates generally to a computer system that allows communication devices, such as X.25 cards, to be shared by workstations on a local area network. Particularly, the present invention relates to a computer system for enabling an application program on a first workstation to access a wide area network communication device residing on a second workstation through a device driver that appears as a file system to workstations on the local area network.

One of the benefits of connecting workstations to a local area network is that resources, such as files, printers, and modems, residing on one workstation may be shared with the other workstations on the network. The alternatives to sharing resources may be costly or inefficient. One option is to equip each workstation with the same set of resources. For expensive resources or environments with a large number of workstations, this solution may be very costly. Another option is to manually transfer (e.g., by hand using floppy disks) any needed information from one workstation to the workstation that has the resource so the resource may be used. In some environments—for example, a software development environment in which a new product is undergoing system test-a significant volume of information may need to be transferred. This solution may be very inefficient, especially if it must be repeated many times during the testing phase of the development cycle.

Although there are many benefits to sharing resources via a local area network, this functionality may be limited in some local area network environments. For example, an environment, such as the Windows NT™ operating system, may allow only files (i.e., disks, printers, and pipes) to be shared across the network. Limitations within the system hardware, software, or both may prevent the sharing of some communication devices such as X.25 cards which in turn provide access to wide area networks. The present invention addresses these limitations so that wide area network communication devices may be shared across a local area network. Consequently, the present invention may be used to share wide area network (WAN) access across a local area network (LAN). Communication devices may be shared because, under the method of the present invention, the device driver for a particular communication device is implemented as a file system driver.

A number of advantages result from implementing the communication device driver as a file system driver. Using a file system driver implementation, the device appears to applications to be a file. Therefore, standard file system calls may be used to access the device. The use of standard system calls facilitates the development of application programs because the programs may use the same call whether the device to be accessed is resident on the local machine or elsewhere. Networking and access details are hidden from the application so that processing is the same whether the device is local or remote. Another advantage of implementing the device driver as a file system driver is that as a file system driver, the device driver may take advantage of functionality provided by other drivers. For example, a file system driver may rely on other drivers that provide networking capabilities. Other approaches may require additional work to provide or replicate the needed functionality.

The advantages of the present invention are explained further by the accompanying drawings and detailed description.

BRIEF DESCRIPTION OF THE DRAWINGS

FIG. 2 shows the application programming interface used by an application to establish a connection with an X.25 card on a remote workstation.

DETAILED DESCRIPTION OF PREFERRED EMBODIMENT(S)

Figure 1:
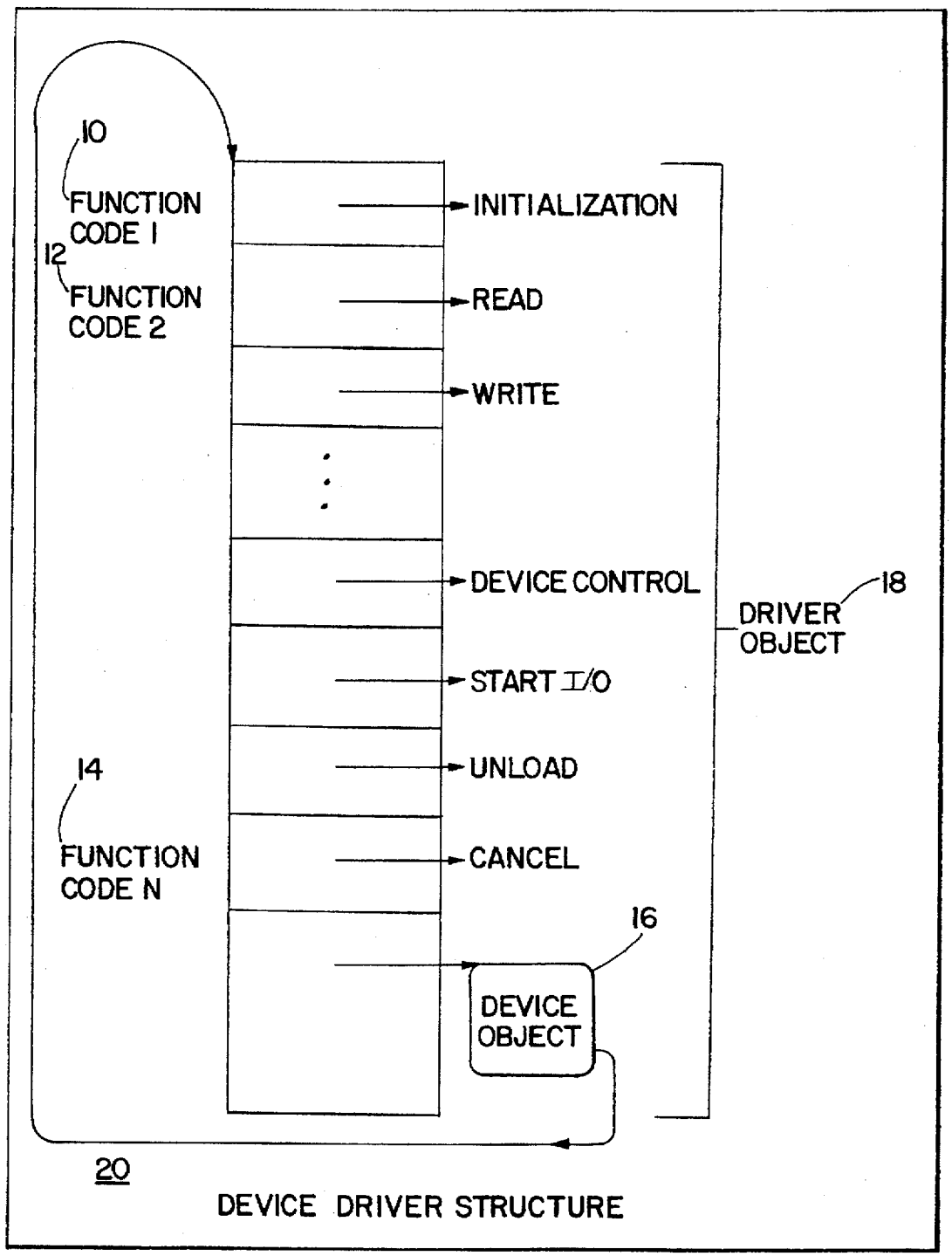
FIG. 1 shows the structure of a device driver in the Windows NT™ environment.

The present invention describes a method for sharing on a local area network communication devices that provide access to a wide area network. The particular embodiment described herein provides for the sharing of an X.25 card in the Windows NT™ operating system environment developed by Microsoft® Corporation. Consequently, references are made to Windows NT™ operating system components and functionality provided in the Windows NT™ operating system. However, the components and functionality provided by Microsoft® Corporation do not form part of the present invention. They are referenced for exemplary purposes only to explain how the present invention interacts with the operating system. The sharing method described may be used to access other communication devices so a particular communication device on one workstation may be made available to other workstations on the local area network.

The present invention solves the problem of sharing a remote X.25 card by making the device appear as a file system to the application program. The X.25 device driver is implemented as a file system driver so that to the application program, the X.25 card appears to be local whether or not it is installed on the local workstation. In the preferred embodiment described herein, the X.25 card, to the operating system, looks like a hard disk and so a disk partition representing the X.25 card may be registered with the operating system. The disk partition may then be shared using a standard partition name such as "C:" or "X:." Application programs may access the X.25 card using the standard partition name and standard file system calls that permit an application to open, close, read, and write to files. The ability to use standard file system calls, rather than a set of device specific calls, may simplify the application development process. Software developers learn and use the standard calls rather then a different set of calls for each different device.

A device driver provides a common mechanism for accessing potentially dissimilar hardware devices. Device driver code conforms to the conventions and operational guidelines of the operating system and provides an interface between the device and the operating system. In addition, a device driver presents a consistent and uniform interface to the application program. In many operating system environments, devices may be accessed as special files in the file system. Therefore, each file, whether a data file or a special device file, may be represented by a file descriptor that the application uses to access the file. Data may then be read or written as a stream of bytes directed to the file. The operating system thus supports both data files and devices in the same way so that one set of basic file manipulation calls may be used in all applications.

In many operating system environments, an I/O manager defines a model of input/output processing and performs functions that are common to or required by more than one driver. A file system driver may encapsulate one or more device drivers. It is a sophisticated device driver that may perform some I/O manager functions. It may accept I/O requests to files and call on other device drivers to service those requests. It may take advantage of specialized interfaces or functionality provided by the I/O manager for drivers. A file system driver hides the location of devices so that applications may use the same interface regardless of the device's location. Within the Windows NT™ environment, for example, both device drivers and file system drivers present the same framework to the operating system. As a result, new drivers may be added to the system without altering existing drivers.

FIG. 1 illustrates the structure of the present invention. It conforms to the requirements of the Windows NT™ operating system The components of the X.25 device driver include: an initialization routine, a set of dispatch routines to handle I/O requests, a completion routine, and cancel/unload/error logging routines. In the diagram, each function code corresponds to a driver entry point. In addition to the routines that comprise the driver, two system objects are created. These system objects facilitate communication between the device driver and the operating system. First, a device object represents the physical, logical, and virtual characteristics of the device such as alignment for buffers and location of device queues. A driver object includes the address of the routines (entry points) that comprise the device driver. The initialization routine creates the device object. The initialization routine also establishes function codes representing the operations it handles and records the driver dispatch routine entry points for those operations. FIG. 1 also illustrates the relationship between device and driver objects. Each device object points back to its driver object. As a result, the operating system can determine which driver routine to invoke when a request is made to access the device.

FIG. 2 presents the function descriptions used by applications to establish and use X.25 connections on remote workstations. The X.25 device driver—the present invention—supports these functions.

Figure 3:
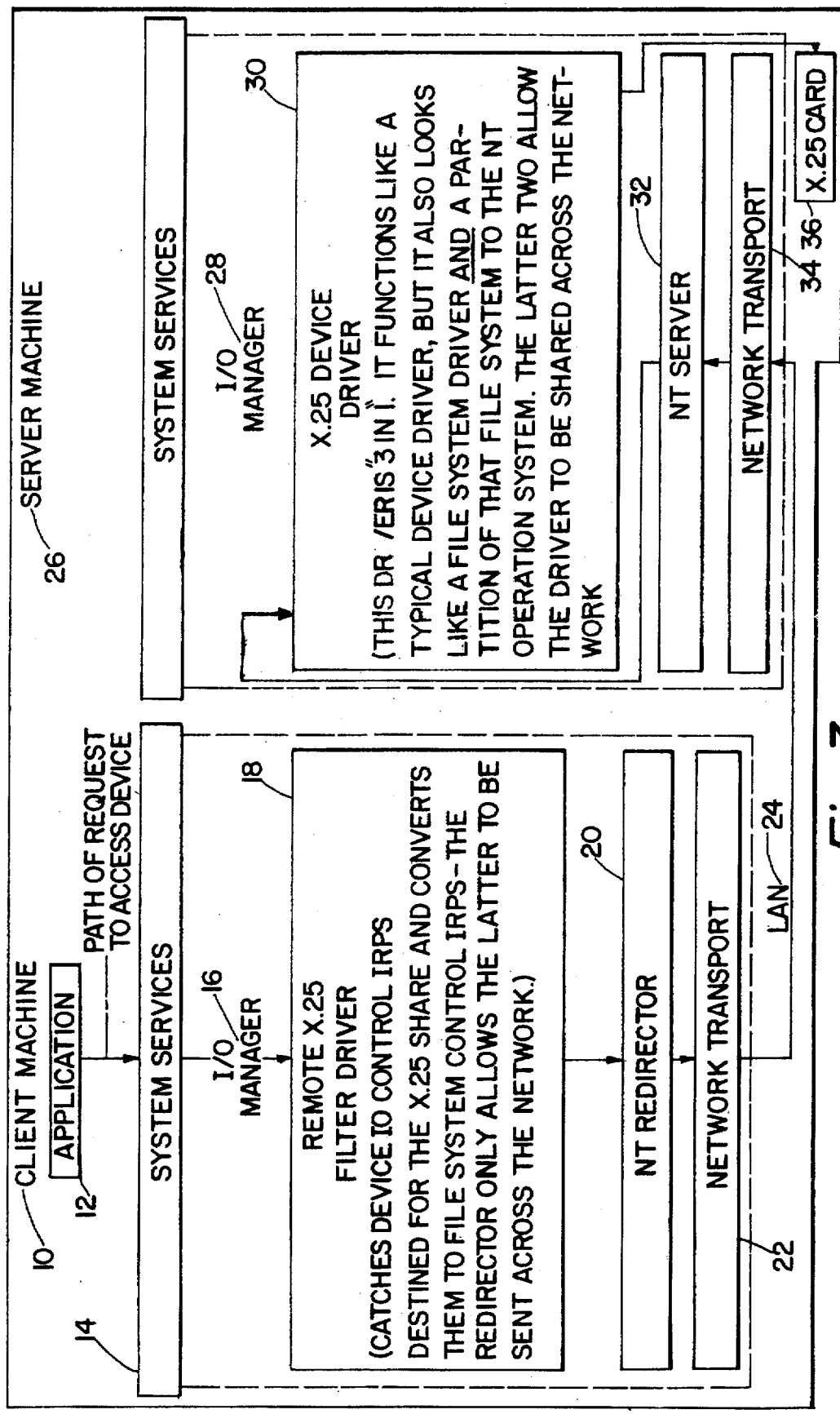
FIG. 3 shows the steps in accessing a device on a remote workstation.

FIG. 3 presents a diagrammatic overview of the process of servicing an application request to access to the X.25 card. The perspectives of the client machine 10 and server machine 26 are shown. The application 12 seeking access to the X.25 card 36 resides on the client machine 10. The X.25 card resides on the server machine 36. The I/O Manager 16, the NT Redirector 20, and Network Transport 22 residing on the client machine 10 are components of the Windows NT™ operating system with which the present invention interacts and do not form part of the present invention. The I/O Manager 28, NT Server 32, and Network Transport 34 residing on the server machine 26 are components of the Windows NT™ operating system with which the present invention interacts and do not form part of the present invention.

Within the Windows NT™ environment, some devices may be shared via the NT Redirector 20 and NT Server 32. The devices that may be shared are those that appear to the Redirector and Server to be sharable, for example, printers, "pipes," and disks. Therefore, for a communication device, such as an X.25 card, to be sharable, it must appear to the NT Redirector and NT Server to be a printer, pipe, or disk. In a preferred embodiment of the present invention, the X.25 card appears to be a disk. The present invention, therefore, overcomes the limitation imposed by the operating system. Currently, the operating system allows only printers, pipes, and disks-but not communication devices such as X.25 cards—to be shared.

For devices that are sharable, requests to access those devices are processed as follows. As explained earlier the I/O manager 16, 28 processes FO requests which may include requests directed to the X.25 card 36. The NT redirector 20 intercepts request for non-local (i.e. shared devices). It then "redirects" them to the machine on which the device actually resides. The Network Transport 22, 34 at each machine is responsible for routing and controlling network traffic across the local area network 24. The request travels across the local area network to the target or server machine. Next, the request goes to the NT Server 32 which is responsible for handling all the messages sent to it by Redirectors on all other machines. It determines whether the device has been started, whether the user who sent the request has permission to use the device, and then forwards the request to the device itself 36. The request which is serviced by the X.25 device driver 28 then travels back the way it came, through the NT Server, back to the NT Redirector, and eventually to the application that initiated the request 12.

Although the components described support transportation of requests to access the X.25 card, the Remote X.25 Filter Driver 18 and X.25 Device Driver 30 of the present invention actually interpret and fulfill the application requests. When the application 10 issues a remote I/O request—the request to access the X.25 card on the remote workstation—the request is handled by the I/O manager 14 of the operating system which issues an I/O request packet (IRP) unique to the present invention.

The IRP is next sent through the Remote X.25 Filter Driver 18. The Filter Driver 18 is responsible for intercepting function calls destined for the shared X.25 card 36 because the NT Redirector 20 will not forward all types of requests. Specifically, Win32DeviceIOControl( ) requests are not forwarded by the NT Redirector 20 unless the function type is changed to "file system control." The NT Redirector 20 allows this type of request to be sent to a server so the Filter Driver 18 on the requesting machine performs a conversion that the NT Redirector 20 then processes.

As described earlier, the request travels across the local area network to the NT Server of the target machine and finally, to the X.25 Device Driver 30. The request is processed by the NT Server and NT Redirector because each component believes the X.25 card to be a sharable disk rather than a communications device. To make the X.25 card appear to be a sharable disk, the X.25 device driver is implemented as a file system driver. Consequently, it handles all the different types of requests that the operating system sends to a file system. Because the operating system views the X.25 card as a disk partition of a file system, the partition may be registered with the operating system and assigned a standard partition name such "C:" or "X:" for applications to use in accessing the X.25. Once registered, the NT Server on the server machine, viewing the X.25 card as a hard disk, forwards incoming requests to the X.25 device driver. Because the Filter Driver 18 changed type of the Device IOControl( ) function, the type must be changed back to the original type to be processed. The X.25 Device Driver 30 performs this special processing so that these calls are handled properly.

Using the present invention, an X.25 card that supports connections to a wide area network may be shared by workstations on a local area network. The X.25 card appears to the operating system to be a partition on a hard disk. Consequently, applications may access the X.25 using a partition name assigned to the device and standard file system calls. The process of developing applications to access the X.25 card is simplified because applications insulated from knowing details about the device's location or specific on how to access the device.

What is claimed is:

1. A method for sharing a communication device on a network, said method comprising the steps of:

providing an application program residing on a first workstation;

providing a communication device residing on a second workstation, said communication device adapted for access in accordance with a file system driver;

converting communication device access requests from said application program to file system control requests compatible with said file system driver; and forwarding said file system control requests from said application program residing on said first workstation to said second workstation.

2. The method of claim 1 wherein said communication device is a X.25 card.

3. A system for sharing a communication device on a network, comprising:

an application program resident on a first workstation;

a communication device resident on a second workstation;

a file system driver for accessing said communication device resident on said second workstation;

a communication device access request initiated by said application program;

a filter driver resident on said first workstation for converting said communication device access request to a file system control request;

a redirector for forwarding said file system control request from said first workstation to said second workstation.

4. The system of claim 3 wherein said communication device is a X.25 card.

5. A system for sharing a X.25 card on a network, comprising:

an application program resident on a first workstation;

a X.25 card resident on a second workstation;

a file system driver for accessing said X.25 card resident on said second workstation;

a request to access said X.25 card, said request initiated by said application program;

a filter driver resident on said first workstation for converting said X.25 card access request to a file system control request; and a redirector for forwarding said file system control request from said first workstation to said second workstation.

* * * * *

UNITED STATES PATENT AND TRADEMARK OFFICE
CERTIFICATE OF CORRECTION

PATENT NO. : 5,680,303
DATED      : October 21, 1997
INVENTOR(S): Mark A. Libucha, et al It is certified that error appears in the above-identified patent and that said Letters Patent is hereby corrected as shown below:

In column 3, line 45, after the word "access", please delete the word "to".

In column 4, line 7, after the word "processes", please delete the word "FO" and replace it with -- I/O--.

In column 4, line 9, please change the word "request" to the word "requests".

In column 4, line 33, after the word "(IRP)" please delete the phrase "unique to the present invention".

In column 4, line 35, after the number 18, but before the word "is", please add -- —unique to the present invention— --.

Signed and Sealed this

Thirty-first Day of March, 1998

*Attest:*

BRUCE LEHMAN

*Attesting Officer*  *Commissioner of Patents and Trademarks*